United States Patent [19]
DeGuia et al.

[11] 4,169,945
[45] Oct. 2, 1979

[54] PROCESS FOR PRODUCTION OF POLYGALACTOMANNAN ETHERS

[75] Inventors: Andrea A. DeGuia, North Plainfield; Robert W. Stackman, Morristown; Anthony B. Conciatori, Chatham, all of N.J.

[73] Assignee: Celanese Corporation, New York, N.Y.

[21] Appl. No.: 867,269

[22] Filed: Jan. 5, 1978

[51] Int. Cl.$^2$ ............................................. C08B 37/00
[52] U.S. Cl. ................................ 536/114; 252/8.55 R
[58] Field of Search ........................................ 536/114

[56] References Cited

U.S. PATENT DOCUMENTS

| 2,650,917 | 9/1953 | Moe | 536/114 |
| 3,223,699 | 12/1965 | Schlageter | 536/114 |
| 4,031,306 | 6/1977 | DeMartino et al. | 536/114 |
| 4,031,307 | 6/1977 | DeMartino et al. | 536/114 |

Primary Examiner—Johnnie R. Brown

[57] ABSTRACT

This invention provides an improved process for producing alkyl ethers of polygalactomannan gum by contacting polygalactomannan gum with alkyl halide in the presence of a metal hydroxide catalyst and a quaternary ammonium phase-transfer agent.

7 Claims, No Drawings

PROCESS FOR PRODUCTION OF POLYGALACTOMANNAN ETHERS

BACKGROUND OF THE INVENTION

The polygalactomannans are polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1-4-$\beta$-glycosidic linkage and the galactose branching takes place by means of a 1-6 linkage on alternate mannose units. The ratio of galactose to mannose in the guar polymer is, therefore, one to two. Guar gum has a molecular weight of about 220,000.

Locust bean gum is also a polygalactomannan gum of similar molecular structure in which the ratio of galactose to mannose is one to four. Guar and locust bean gum are the preferred sources of the polygalactomannans, principally because of the commercial availability thereof.

Polygalactomannan gums swell readily in cold water and can be dissolved in hot water to yield solutions which characteristically have a high viscosity even at a concentration of 1-1.5 percent. Guar gum and locust bean gum as supplied commercially usually have a viscosity (at 1% concentration) of around 1000 to 4000 centipoises at 25° C. using a Brookfield Viscometer Model LVF, spindle No. 2 at 6 rpm.

For a number of commercial applications it is advantageous to have a gum that provides a solution viscosity lower than that imparted by the same gum in the form in which it is ordinarily sold commercially. Thus, for various food products wherein a polygalactomannan is incorporated as a thickener or is used in a gel or jelly-type product, it is desirable to employ a gum which has a one percent solution viscosity between about 1000 and 2000 centipoises at 25° C. Solutions having lower viscosities than those produced with conventional commercial gum are also advantageous in paper making procedures, either in the beater or when used as a sizing. Low viscosity solutions of polygalactomannan gums also find special application in the sizing and printing of textiles.

There are various other rigorous applications that require greater stability under variable conditions than is provided by hydrocolloid gums that are commercially available. For example, it is desirable that a gum which functions as a protective colloid or gelling agent in oil well drilling mud compositions and oil well fracturing compositions exhibit a degree of solution stability and heat stability under operating conditions.

Further, solutions of ordinary hydrocolloid gums are not sufficiently stable under variable conditions of pH and temperature or not sufficiently stable in the presence of polyvalent metal ions, to qualify for general application in the textile industry for sizing, printing and finishing operations, or in the paper industry as sizing and coatings agents.

Accordingly, it is a main object of the present invention to provide a process for producing hydrocolloid gums having improved properties for applications in petroleum, textile, printing, paper, food and pharmaceutical industries.

It is another object of the present invention to provide an improved process for producing polygalactomannan ether derivatives.

It is another object of the present invention to provide guar gum and locust bean gum compositions containing alkyl ether substituents.

It is a further object of the present invention to provide aqueous guar gum and locust bean gum compositions which are superior in solution stability and heat stability in comparison with unmodified guar gum and locust bean gum.

Other objects and advantages shall become apparent from the following description and examples.

DESCRIPTION OF THE INVENTION

One or more objects of the present invention are accomplished by a process for preparing alkyl ethers of polygalactomannan gum which comprises reacting polygalactomannan gum with an alkyl halide in the presence of (1) at least a stoichiometric quantity of a strongly basic metal hydroxide, based on the weight of alkyl halide, and (2) between about 0.05 and 5 weight percent of a water-soluble quaternary ammonium halide phase-transfer agent, based on the weight of polygalactomannan gum; in an aqueous reaction medium at a temperature between about 10° C. and 100° C. for a reaction period sufficient to achieve a degree of substitution by alkyl ether groups between about 0.01 and 3.0.

Whenever the following description refers specifically to guar gum, it is understood that the disclosure is applicable to other closely related polygalactomannan gums in general, and locust bean gum in particular.

The term "alkyl halide" is meant to include alkenyl and aralkyl halides such as allyl halide and benzyl halide. The preferred alkyl halides are alkyl chlorides and alkyl bromides containing between one and about twenty carbon atoms, e.g., methyl chloride and bromide, pentyl chloride and bromide, decyl chloride and bromide, eicosyl chloride and bromide, and the like.

By the term "degree of substitution" as employed herein is meant the average substitution of ether groups per anhydro sugar unit in the polygalactomannan gums. In guar gum, the basic unit of the polymer consists of two mannose units with a glycosidic linkage and a galactose unit attached to a hyroxyl group of one of the mannose units. On the average, each of the anhydro sugar units contains three available hydroxyl sites. A degree of substitution of three would mean that all of the available hydroxy sites have been substituted with alkyl ether groups.

The etherification processes of the present invention are applicable to polygalactomannan gums in the form of finely divided powders or in the form of gum "splits".

Guar gum and other polygalactomannan hydrocolloids are derived from certain seeds of the plant family "leguminosae". The seeds are composed of a pair of tough, non-brittle endosperm sections referred to as "splits", between which is sandwiched a brittle embryo layer. The entire structure is enclosed in a tough seed coat.

The endosperm splits are extremely tough and non-brittle. This renders them difficult to reduce into a finely divided state. One method of separating the endosperm splits is described in U.S. Pat. No. 3,132,681. Methods of reducing endosperm splits into finely divided powder are described in U.S. Pat. No. 2,891,050; U.S. Pat. No. 3,455,899; and references cited therein. In a preferred embodiment of the present invention, alkyl ethers of guar gum or locust bean gum are prepared by contacting solid guar gum or locust bean gum with alkyl halide and a stoichiometric excess of alkali metal hydroxide in an aqueous reaction medium in the presence of a water-miscible quaternary ammonium phase transfer agent, at a temperature between about 10° C. and 100° C. for a reaction period sufficient to achieve a degree of substitution by alkyl ether groups between about 0.01 and 3.0.

The solid guar gum or other polygalactomannan which is etherified can be in the form of endosperm splits or in the form of finely divided powder which is derived from the endosperm splits. It is an important feature of the present invention process that the polygalactomannan gum being etherified with alkyl groups can remain as a solid phase in the reaction medium during the reaction period.

The quantity of alkyl halide employed is determined by the degree of substitution which it is desirable to achieve. For example, the etherification of five parts by weight of guar gum with one part by weight of alkyl chloride nominally yields guar gum ether having a 0.3 degree of substitution. A higher relative weight ratio of alkyl halide reactant to galactomannan gum yields a higher degree of substitution. Generally, the preferred degree of substitution is in the range between about 0.05 and 2.5.

In a preferred embodiment of the invention process described above, the etherification reaction between guar gum or locust bean gum and alkyl halide reactant is conducted in the presence of at least a stoichiometric quantity, and most preferably a stoichiometric excess, of strongly basic metal hydroxide. The metal hydroxide performs both as a reactant and as a catalyst. The hydroxide and the polygalactomannan gum interact to form an alkoxide derivative. The alkoxide derivative so formed then in turn reacts with alkyl halide via a Williamson reaction mechanism, thereby introducing alkyl ether substituents into the polygalactomannan gum. This latter etherification reaction is catalyzed by the presence of basic metal hydroxide. The hydroxide component which functions as a reactant/catalyst can vary in quantity between about 1 and 3 moles of hydroxides per mole of alkyl halide present in the reaction system. Any stoichiometric excess of hydroxide corresponds to the quantity not consumed in the Williamson etherification reaction. Illustrative of strongly basic metal hydroxide catalysts are alkali metal hydroxides such as sodium hydroxide, potassium hydroxide and lithium hydroxide.

In addition to the metal hydroxide catalyst, the invention process is conducted in the presence of a water-soluble quaternary ammonium halide phase-transfer agent. The said quaternary ammonium halide transfer agent is employed in a quantity between about 0.05 and 5 weight percent, and preferably in a quantity between about 0.1 and 3 weight percent, based on the weight of polygalactomannan gum in the reaction system.

Preferred water-soluble quaternary ammonium halide phase-transfer agents are those in which the anion is either chloride or bromide, and the total number of carbon atoms in the phase-transfer agents is in the range between about four and forty, respectively. Illustrative of suitable water-soluble phase-transfer agents are tetramethylammonium chloride and bromide, benzyltrimethylammonium chloride and bromide, tetraethylammonium chloride and bromide, tetrabutylammonium chloride and bromide, methylpyridinium chloride and bromide, benzylpyridinium chloride and bromide, trimethyl-p-chlorobenzyl-ammonium chloride and bromide, triethylanolmethylammonium chloride and bromide, and the like.

The inclusion of a water-soluble quaternary ammonium phase-transfer agent is a critical feature of the present invention improved process for etherification of polygalactomannan gums. As illustrated in the Examples in the present specification, the inclusion of a phase-transfer agent in the present invention etherification reaction medium results in a substantial increase in process efficiency, i.e., the utilization of the alkyl halide reactant in the etherification reaction is increased in comparison with the same process conducted in the absence of a phase-transfer agent.

The invention process is conveniently conducted as a two-phase reaction system comprising an aqueous solution, or an aqueous solution of a water-miscible solvent, in contact with solid polygalactomannan gum. In the case of the water-miscible solvent medium, the water content of the medium preferably is maintained in the range between about 10 and 60 weight percent, depending on the particular solvent of choice. If more than an optimum quantity of water is present in this type of reaction medium, then the polygalactomannan gum may swell or enter into solution, thereby complicating product recovery and purification.

Suitable water-miscible solvents for suspension of polygalactomannan gum in the reaction medium include alkanols, glycols, cyclic and acyclic alkyl ethers, alkanones, dialkylformamide, and the like, and mixtures thereof. Illustrative of suitable water-miscible solvents are methanol, ethanol, isopropanol, secondary butanol, secondary pentanol, ethyleneglycol, acetone, methylethylketone, diethylketone, tetrahydrofuran, dioxane and dimethylformamide.

The invention process for alkyl etherification of polygalactomannan gum is conducted at a temperature in the range between about 10° C. and 100° C. and preferably in the range between about 20° C. and 60° C. For convenience, the process can be conducted at ambient temperature. At the lower temperatures the reaction rate is slower, and at the higher temperatures the reaction is faster but the formation of by-products is increased. The reaction time can be varied in the range between about 1 and 12 hours, and preferably in the range between about 4 and 8 hours.

The invention process is preferably conducted in closed vessels equipped with stirrers, in batch or continuous operation.

After the completion of the alkyl etherification reaction, the solid polygalalctomannan alkyl ether product is separated from the fluid reaction medium by centrifugation or filtration. The solid product so recovered is preferably further treated and purified by washing with the same water-miscible solvent as previously employed in the process, and then by further washing with a more anhydrous form of the same solvent. It is preferred that the product mixture from the process be neutralized with an acid before the procedure of solvent washes. Acetic acid or other organic acid is advantageous for the neutralization step since it does not increase the ash content of the polygalactomannan alkyl ether product.

In comparison to the corresponding polygalactomannan gums from which the alkyl ether derivatives are synthesized, the present invention hydrocolloid products have a greater degree of clarity, and are more stable under extreme conditions of pH and in the presence of polyvalent metal ions.

The invention hydrocolloid products are superior to conventional gums for application in petroleum, textile, printing, paper, food and pharmaceutical industries.

Alkyl ethers of polygalactomannan gum prepared in accordance with the present invention process have excellent viscosity and suspending properties for application as gelling agents in hydraulic well-treating fluid compositions. A typical hydraulic fluid composition consists essentially of (1) an aqueous medium, (2) alkyl ether of polygalactomannan gum, (3) a breaker additive, and (4) a propping agent, is eminently suitable for application as well-fracturing fluid media.

The said hydraulic fluid composition exhibits excellent solution stability and heat stability in comparison with the corresponding hydraulic fluid composition containing unmodified polygalactomannan gum as a gelling agent. The said hydraulic fluid composition has superior ability to hydrate and develop high viscosity in the presence of salts. Further, a breaker additive can hydrolyze the polygalactomannan alkyl ether gum at a convenient rate and with a resultant low yield of hydrolysis residue, e.g., a yield of less than about 2 weight percent residue, based on the original weight of polygalactomannan alkyl ether gum gelling agent. Illustrative of breaker additives are enzymes, acids, and oxidizing agents.

The following examples are further illustrative of the present invention. The reactants and other specific ingredients are presented as being typical, and various modifications can be derived in view of the foregoing disclosure within the scope of the invention.

EXAMPLE I

Purification Of Guar Gum

Guar gum is extracted with methanol to remove methanol-soluble oils. The guar gum so treated is wetted with isopropanol, then sufficient water is added slowly to form a 0.5% solution. After standing overnight, the solution is centrifuged at 8000 rpm for 30 minutes. The clear supernatant is decanted from the insoluble residue and filtered through glass fiber filter paper.

The filtrate solution is diluted with ethanol to precipitate the guar gum. The precipitate is filtered, dried, and ground in a Wiley mill through a 40 mesh screen.

The purified guar gum powder has less than 0.1% nitrogen content, and about 0.48% ash content. For the purposes of the present invention, a polygalactomannan alkyl ether can be prepared from either the purified or unpurified guar gum.

EXAMPLE II

| Preparation of Polygalactomannan Alkenyl Ethers | | | | |
|---|---|---|---|---|
| Formulation reference | A | A' | B | B' |
| 50% Isopropanol | 1800 mls | 1800 | 1800 mls | 1800 |
| Guar gum | 300 grams | 300 | — | — |
| Locust bean gum | — | — | 300 grams | 300 |
| 50% Sodium hydroxide | 120 grams | 240 | 120 grams | 300 |
| Allyl chloride | 60 grams | 120 | 60 grams | 120 |
| Benzyltrimethyl-ammonium bromide | 3 grams | 3 | 3 grams | 3 |

The polygalactomannan gum is slurried in the isopropanol solution, then heated to 50° C. and purged for one hour with nitrogen. The caustic solution and phase-transfer agent are added to the slurry, and the mixture is stirred for ten minutes.

The allyl chloride reactant is added to the mixture, and the etherification reaction is conducted at 50° C. over a period of eight hours. The reaction mixture is neutralized to a pH of 7 with acetic acid, then filtered, washed twice with 50% isopropanol and once with 100% isopropanol. The polygalactomannan ether product is recovered and air-dried.

The higher the degree of substitution of allyl ether groups in the polygalactomannan ether derivatives, the greater the stability under varying conditions of pH and temperature. The polygalactomannan ether derivatives of the present invention have the further advantages of improved solution stability and resistance to bacterial degradation.

A guar gum ether derivative produced in accordance with Formulation A hereinabove has a degree of substitution of 0.3. A 1% aqueous solution of this ether derivative, after standing at 25° C. for nineteen hours, has a viscosity of 2000 CPS.

A guar gum ether produced in accordance with Formulation B hereinabove has a degree of substitution of 0.6. A 1% aqueous solution of this ether derivative, after standing at 25° C. for 19 hours, has a viscosity of 900–1000 CPS.

A guar gum ether having a degree of substitution above about 1.0 is essentially water insoluble at temperatures below about 100° C.

EXAMPLE II

| Preparation Of Polygalactomannan Alkyl Ethers | | | | | |
|---|---|---|---|---|---|
| Formulation reference | A | B | C | D | E |
| Water, grams | 115 | 115 | 115 | 105 | 105 |
| Gum splits, grams | 100 | 100 | 100 | 100 | 100 |
| 50% Sodium hydroxide, grams | 20 | 20 | 20 | 40 | 40 |
| [(CH$_3$)$_4$N$^+$]Cl$^-$, grams | — | 0.1 | — | — | 0.1 |
| [O$_3$P$^+$CH$_2$O]Cl$^-$, grams | — | — | 0.3 | — | — |
| Methyl bromide, grams | 25 | 25 | 25 | 50 | 50 |
| Degree of substitution | 0.21 | 0.26 | 0.25 | 0.30 | 0.54 |
| Efficiency of methyl bromide utilization, % | 44 | 56 | 53.5 | 32 | 57 |

The guar splits are slurried in the water medium in a pressure reactor, heated to 50° C. and purged with nitrogen for one hour. The sodium hydroxide solution and phase-transfer agent (when employed) are added to the mixture and stirred for 10–20 minutes.

The methyl bromide is slowly metered into the reaction over a period of several hours while maintaining the reactor pressure below 20 psi. The reactor is cooled and the mixture neutralized with acetic acid. The solid product is washed with 50% methanol, and then is ground in the presence of methanol in a Waring Blendor. The polygalactomannan methyl ether thus prepared is recovered and dried.

The data above illustrates the increased alkyl halide utilization which is achieved by employing a phase-transfer agent in accordance with the present invention process.

EXAMPLE IV

Oil Well Fracturing, Insoluble Residue Test

Guar gum methyl ether (D.S. of 0.3) produced in accordance with the present invention process is dissolved in 400 mls of water to form a 0.5% aqueous solution. To the solution is added 0.01% by weight of hemicellulase enzyme, and the solution is aged overnight at 30° C., and then centrifuged. Supernatant liquid is decanted, and insoluble residue is recovered. The residue is slurried with water, then the residue is separated from the liquid, dried and weighed.

In the same manner a commercial guar gum is subjected to enzyme treatment, and residual solid is recovered and weighed for comparison purposes.

The weight of the insoluble residue from the invention guar gum methyl ether after enzyme treatment is 1.4%, based on the original weight of guar gum methyl ether.

By comparison, the weight of the insoluble residue from the commercial guar gum after similar enzyme treatment is 10.8%.

This comparison demonstrates that methyl ether of polygalactomannan gum is better adapted than commercial polygalactomannan gum for application as a gelling agent in hydraulic well-fracturing fluid compositions. Polygalactomannan methyl ether gum is superior to unmodified polygalactomannan gum because under oil well fracturing conditions it is more heat stable and it leaves much less clogging residue after enzyme treatment.

EXAMPLE V

Hydration Of Guar Methyl Ether Gum In A Salt Solution

The viscosity (CPS) of a 1% solution of guar gum methyl ether (D.S. of 0.3) was measured in comparison with guar gum.

|  | Guar Methyl Ether | Guar |
| --- | --- | --- |
| Water | 4540 | 4600 |
| 10% Calcium chloride | 4680 | 4300 |

Guar methyl ether gum hydrates to a greater degree than does guar gum in a salt solution.

Also, it has been found that guar gum does not hydrate in 50% aqueous methanol, while under the same conditions guar gum methyl ether hydrates and the solution develops higher viscosity.

What is claimed is:

1. In a process for preparing alkyl ethers of polygalactomannan gum by the reaction of polygalactomannan gum with alkyl halide, the improvement which comprises reacting polygalactomannan gum with an alkyl halide in the presence of (1) at least a stoichiometric quantity of a strongly basic metal hydroxide, based on the weight of alkyl halide, and (2) between about 0.05 and 5 weight percent of a non-reactive water-soluble quaternary ammonium halide phase-transfer agent, based on the weight of polygalactomannan gum; in an aqueous reaction medium at a temperature between about 10° C. and 100° C. for a reaction period sufficient to achieve a degree of substitution by alkyl ether groups between about 0.01 and 3.0.

2. A process in accordance with claim 1 wherein the polygalactomannan gum is guar gum.

3. A process in accordance with claim 1 wherein the polygalactomannan gum is locust bean gum.

4. A process in accordance with claim 1 wherein the polygalactomannan gum is in solid form during the process.

5. A process in accordance with claim 1 wherein the alkyl halide contains between one and about twenty carbon atoms.

6. A process in accordance with claim 1 wherein the strongly basic metal hydroxide is an alkali metal hydroxide.

7. A process in accordance with claim 1 wherein the quaternary ammonium halide phase transfer agent is tetramethylammonium chloride.

* * * * *